United States Patent
Jo et al.

(10) Patent No.: US 12,050,263 B2
(45) Date of Patent: Jul. 30, 2024

(54) QUANTUM RECEIVER USING SQUARE OF HOMODYNE DETECTION FOR TARGET DETECTION OF QUANTUM RADAR AND MEASUREMENT METHOD THEREFOR

(71) Applicant: AGENCY FOR DEFENSE DEVELOPMENT, Daejeon (KR)

(72) Inventors: Yonggi Jo, Daejeon (KR); Suyong Lee, Daejeon (KR); Sangkyung Lee, Daejeon (KR); Yongsup Ihn, Daejeon (KR); Zaeill Kim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/002,240

(22) PCT Filed: Jul. 13, 2021

(86) PCT No.: PCT/KR2021/009000
§ 371 (c)(1),
(2) Date: Dec. 16, 2022

(87) PCT Pub. No.: WO2022/025484
PCT Pub. Date: Feb. 3, 2022

(65) Prior Publication Data
US 2023/0314606 A1  Oct. 5, 2023

(30) Foreign Application Priority Data
Jul. 31, 2020 (KR) .................. 10-2020-0095698

(51) Int. Cl.
*G01S 17/04* (2020.01)
*G01S 7/481* (2006.01)
*G01S 17/00* (2020.01)

(52) U.S. Cl.
CPC .......... *G01S 17/04* (2020.01); *G01S 7/4816* (2013.01); *G01S 17/006* (2013.01)

(58) Field of Classification Search
CPC ...... G01S 17/04; G01S 7/4816; G01S 17/006; G01S 7/48; G01S 7/481; G01S 7/4912; G01S 17/00; G01S 7/4804
See application file for complete search history.

(56) References Cited

U.S. PATENT DOCUMENTS 8,175,273 B2  5/2012 Kawamoto et al.
9,383,441 B2  7/2016 Younis
(Continued)

FOREIGN PATENT DOCUMENTS

KR  10-2017-0056570 A  5/2017
KR  10-1833956 B1  3/2018
(Continued)

OTHER PUBLICATIONS

International Search Report of PCT/KR2021/009000, dated Nov. 1, 2021, 4 pages.
(Continued)

*Primary Examiner* — Thanh Luu
*Assistant Examiner* — Monica T Taba
(74) *Attorney, Agent, or Firm* — Lewis Roca Rothgerber Christie LLP

(57) ABSTRACT

The objective of the present invention is to provide a quantum receiver using square of homodyne detection for detecting a target of a quantum radar by using the square of homodyne detection that uses homodyne detection used in quantum information processing using continuous variables, and data processing, and a measurement method therefore. In order to achieve the above objective, the quantum receiver for detecting a target of a quantum radar using the square of homodyne detection according to the present (Continued)

invention comprises: a first 50:50 beam splitter for mixing signals coming into an input terminal; and two light quantity measurement units for measuring the quantity of light respectively outputted to two output terminals of the first 50:50 beam splitter.

7 Claims, 12 Drawing Sheets

(56) References Cited

U.S. PATENT DOCUMENTS

| | | | |
|---|---|---|---|
| 10,310,069 | B2 | 6/2019 | Younis |
| 11,133,928 | B2 | 9/2021 | Rhee et al. |
| 11,212,086 | B2 | 12/2021 | Rhee et al. |
| 11,435,226 | B2 | 9/2022 | Hong et al. |
| 2002/0041687 | A1* | 4/2002 | Parks .................... H04L 7/0075 380/263 |
| 2004/0200952 | A1* | 10/2004 | Beausoleil, Jr. ....... B82Y 10/00 250/225 |
| 2006/0083376 | A1 | 4/2006 | Kawamoto et al. |
| 2011/0032532 | A1* | 2/2011 | Hirano .................... G02F 1/353 359/328 |
| 2016/0209497 | A1* | 7/2016 | Habif ...................... G01S 7/495 |
| 2017/0131398 | A1 | 5/2017 | Younis |
| 2019/0341734 | A1 | 11/2019 | Hong et al. |
| 2019/0386064 | A1 | 12/2019 | Valouch et al. |
| 2020/0195428 | A1 | 6/2020 | Rhee et al. |
| 2020/0304300 | A1 | 9/2020 | Rhee et al. |

FOREIGN PATENT DOCUMENTS

| | | |
|---|---|---|
| KR | 10-2019-0113820 A | 10/2019 |
| KR | 10-2031966 B1 | 10/2019 |
| KR | 10-2038862 B1 | 10/2019 |

OTHER PUBLICATIONS

Lloyd, "Enhanced Sensitivity of Photodetection via Quantum Illumination," Science, vol. 321, Sep. 12, 2008, pp. 1463-1465.
Tan, et al., "Quantum Illumination with Gaussian States," Physical Review Letters 101, 253601, Dec. 19, 2008, 4 pages.
Guha, "Receiver design to harness quantum illumination Advantage," ISIT 2009 IEEE International Symposium on Information Theory, Seoul, 2009, pp. 963-967.
Guha, et al., "Gaussian-state quantum-illumination receivers for target detection," Physical Review A 80, 052310, 2009, 4 pages.
Zhuang et. al., "Optimum Mixed-State Discrimination for Noisy Entanglement-Enhanced Sensing," Physical Review Letters 118, 040801, Jan. 27, 2017, 6 pages.
Höijer, et al., "Quantum Radar—A survey of the science, technology and literature" FOI, Dec. 2019, 42 pages.
Jiang et al., "Super-Resolving Quantum Radar: Coherent-State Sources with Homodyne Detection Suffice to Beat the Diffraction Limit," arXiv: 1305.4162v3 [quant-ph] Feb. 17, 2014, 23 pages.
Delaubert et al., "$TEM_{10}$ homodyne detection as an optimal small-displacement and tilt-measurement scheme," Physical Review A 74, 053823, 2006, 10 pages.
Jeon et al., "Tendencies and Prospects on Quantum Radar Systems," The Journal of Korean Institute of Communications and Information Sciences '18-12, vol. 43, No. 12, 2018, 14 pages.

* cited by examiner

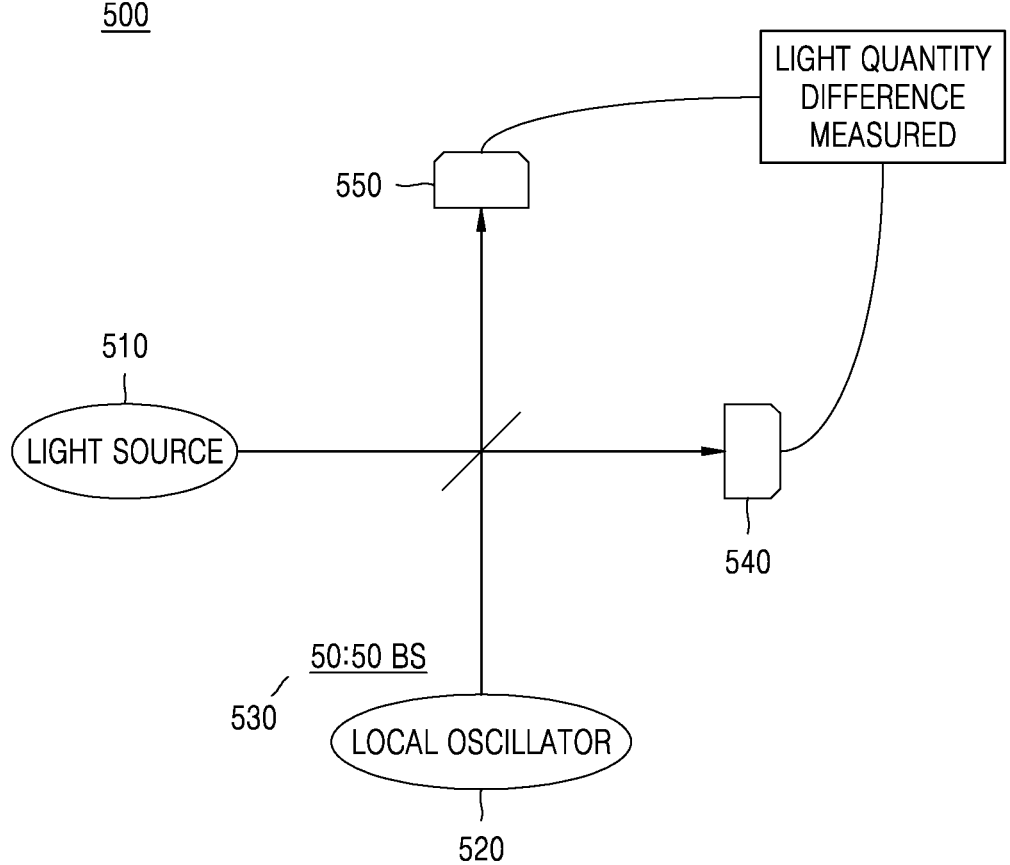

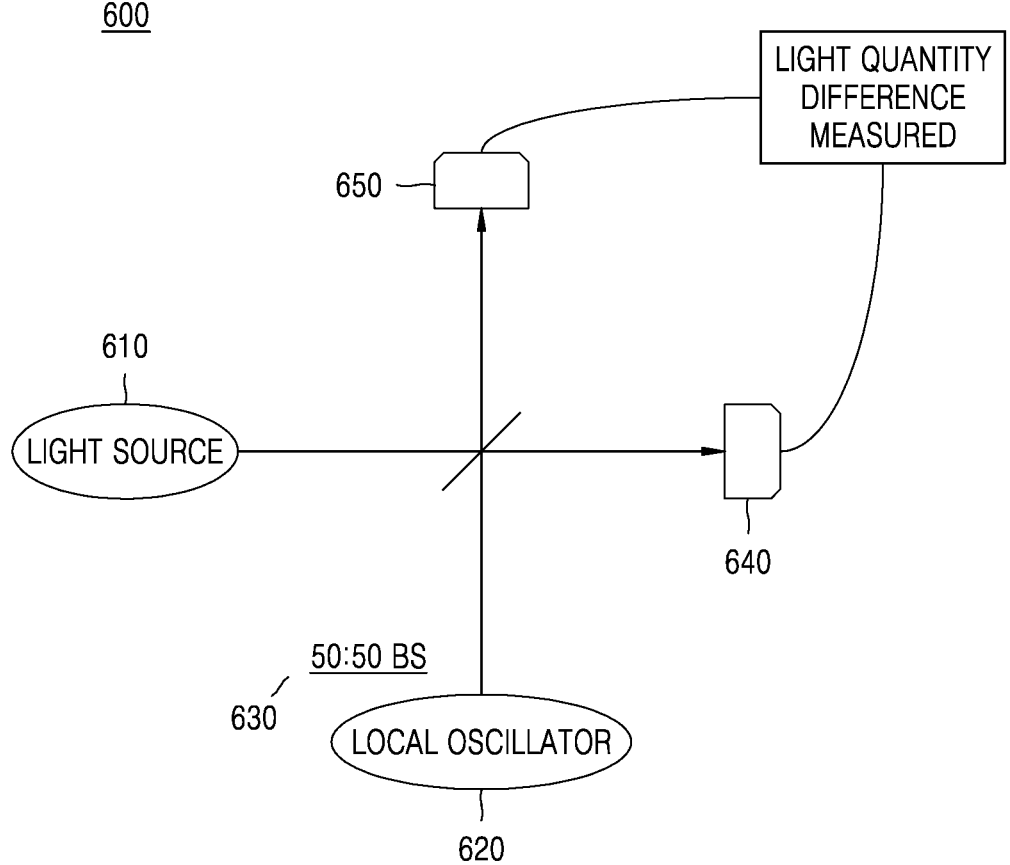

US 12,050,263 B2

QUANTUM RECEIVER USING SQUARE OF HOMODYNE DETECTION FOR TARGET DETECTION OF QUANTUM RADAR AND MEASUREMENT METHOD THEREFOR

CROSS-REFERENCE TO RELATED APPLICATION

This application is a U.S. National Phase Patent Application of International Application Number PCT/KR2021/009000, filed on Jul. 13, 2021, which claims priority of Korean Patent Application Number 10-2020-0095698, filed on Jul. 31, 2020, the entire content of each of which is incorporated herein by reference.

TECHNICAL FIELD

The present disclosure relates to a quantum receiver and, in more detail, a quantum receiver using square of homodyne detection for target detection of a quantum radar, and a measurement method therefor.

BACKGROUND ART

In general, quantum illumination is a technology of checking whether there is a target using a pair of signals entangled in terms of quantum dynamics.

FIG. 1 is a diagram showing the configuration of quantum illumination of the related art.

Referring to FIG. 1, unlike that existing classical illumination checks whether there is a target by measuring a signal reflected and returned by a target by generating a signal wave, quantum illumination sends a signal of the signal and an idler, which are a pair of generated quantum states, to a target and then measures the reflected and returned quantum state together with the idler that is the other one quantum state.

FIG. 2 is a diagram showing expectation value distribution when there is no target (H0, red line0 and when there is a target (H1, blue line) in quantum illumination of the related art, in which T is a reference for determining whether there is a target, the red surface shows false alarm, and the blue surface shows missed detection.

Referring to FIG. 2, whether there is a target (H1) or not (H0) is determined in accordance with a measurement value.

However, in this illumination matter, a loss of a signal and noise are the most important factors that make target detection difficult.

When the reflectivity of a target is low or a sent signal does not return due to dispersion, etc., missed detection that a target is not detected even though the target exists is generated, and a measurement device may generate false alarm due to thermal noise even though there is a target.

The sum of the possibility of missed detection and the possibility of false alarm is called an error ratio.

It has been known that since quantum illumination uses signals having strong quantum dynamic interrelationship called entanglement that is not explained through classical physical theories, when the reflectivity of a target is very low and thermal noise is great, the quantum illumination has an error ratio lower than that of classical illumination.

As described above, quantum illumination sends only one signal of two signals having interrelationship to a target.

To this end, entanglement called Two-Mode Squeezed Vacuum (TMSV) is used.

TMSV can be expressed as in the following Equation 1 for a quantum number mode.

$$|TMSV\rangle = \sum_{n=0}^{\infty} \sqrt{\frac{N_S^n}{(N_S+1)^{(n+1)}}} |n\rangle_S |n\rangle_I \qquad \text{Equation (1)}$$

where Ns is an average number quanta in one mode.

A signal (S) mode of two generated modes is sent to a target and an idler (I) mode is preserved by a preserver such as a delay line or a quantum memory and is then measured together with a signal reflected and returned by the target, whereby whether there is a target is measured.

In this case, the reason of measuring two signals together is for observing variation of the interrelationship between the two signals.

When a preservation operator of thermal noise is $\hat{a}_B$, the preservation operator $\hat{a}_R$ of a returned signal has the relationship with a preservation operator $\hat{a}_S$ of a signal mode as in the following Equation 2.

$$\hat{a}_R = \sqrt{\kappa}\hat{a}_S + \sqrt{1-\kappa}\hat{a}_B \qquad \text{(Equation 2)}$$

where κ is the reflectivity of a target.

When only noise is measured due to a loss of a sent signal (κ=0), interrelationship with another signal is not observed, and when even only a portion of a sent signal returns (κ≠0), interrelationship would be measured.

It is an important matter in quantum illumination how much interrelationship variation it is possible to measure.

It is a very difficult matter to configure a quantum receiver for measuring interrelationship in quantum illumination, so only a small number of receivers have been studied.

An Optical Parametric Amplifier (OPA), a Phase Conjugate (PC) receiver, and a Feed-Forward Sum-Frequency Generation (FF-SFG) receiver are representative of such receivers.

When these receivers are used, it is possible to achieve quantum illumination having an error ratio lower than the theoretical minimum error ratio in the classical illumination.

However, the receivers described above all use non-linear optic devices for interaction between two signals.

Such non-linear optic devices have a problem of reducing measurement efficiency and complicating test configuration in a quantum illumination test that uses a signal in which the average number of quanta is smaller than 1.

Accordingly, it is required to develop a measurement system that does not use a non-linear optic device, increases measurement efficiency, and has an error ratio lower than that in the classical illumination.

DISCLOSURE

Technical Problem

An objective of the present disclosure for solving the problems in the related art described above is to provide a quantum receiver using square of homodyne detection for target detection of a quantum radar, the quantum receiver using homodyne detection, which is used in quantum information processing using a continuous variable, and square of homodyne detection, which uses data processing, and a measurement method therefor.

Technical Solution

In order to achieve the objectives, a quantum receiver using square of homodyne detection for target detection of a quantum radar according to the present disclosure includes: a first 50:50 beam splitter mixing signals traveling inside through an input terminal; and two light quantity measurers measuring light quantities that are output through two output terminals of the first 50:50 beam splitter.

Further, the quantum receiver using square of homodyne detection for target detection of a quantum radar according to the present disclosure includes: a first light quantity measurer performing homodyne detection on a light quantity that is output through a first output terminal that is one of the two output terminals; and a second light quantity measurer performing homodyne detection on a light quantity that is output through a second output terminal that is the other of the two output terminals.

Further, in the quantum receiver using square of homodyne detection for target detection of a quantum radar according to the present disclosure, the first light quantity measurer mixes alight signal traveling into the first light quantity measurer and a continuous wave generated by a first local oscillator using a second 50:50 beam splitter, and performs first homodyne detection for measuring first light quantity differences that are output through two output terminals of the second 50:50 beam splitter, respectively.

Further, in the quantum receiver using square of homodyne detection for target detection of a quantum radar according to the present disclosure, the first light quantity measurer mixes alight signal traveling into the second light quantity measurer and a continuous wave generated by a second local oscillator using a third 50:50 beam splitter, and performs second homodyne detection for measuring second light quantity differences that are output through two output terminals of the third 50:50 beam splitter, respectively.

Further, in the quantum receiver using square of homodyne detection for target detection of a quantum radar according to the present disclosure, a phase difference between the first local oscillator and the second local oscillator is Π/2.

Further, in the quantum receiver using square of homodyne detection for target detection of a quantum radar according to the present disclosure, a value of square of homodyne detection is generated by squaring a measurement value of the first homodyne detection and a measurement value of the second homodyne detection and then summing up the squared values.

Further, in the quantum receiver using square of homodyne detection for target detection of a quantum radar according to the present disclosure, whether there is a target is determined using the value of square of homodyne detection.

Further, in the quantum receiver using square of homodyne detection for target detection of a quantum radar according to the present disclosure, it is determined that there is no target when the value of square of homodyne detection is larger than a predetermined reference value, and it is determined that there is a target when the value of square of homodyne detection is smaller than the predetermined reference value.

Further, in the quantum receiver using square of homodyne detection for target detection of a quantum radar according to the present disclosure, the first homodyne detection measures a position of an optical signal traveling into the first light quantity measurer, and the second homodyne detection measures momentum of an optical signal traveling into the second light quantity measurer.

Further, in the quantum receiver using square of homodyne detection for target detection of a quantum radar according to the present disclosure, signals traveling in to the first 50:50 beam splitter are a signal and an idler that are a pair of quantum states generated by a light source that is quantum illumination, and the signal and the idler have been entangled.

Further, in the quantum receiver using square of homodyne detection for target detection of a quantum radar according to the present disclosure, the signal generated by the light source is a quantum-state signal that is sent to a target, is reflected, and then travels into the first 50:50 beam splitter.

Further, in the quantum receiver using square of homodyne detection for target detection of a quantum radar according to the present disclosure, the idler generated by the light source is a quantum-state signal that is preserved and then travels into the first 50:50 beam splitter simultaneously together with the returned signal.

Meanwhile, a method of square of homodyne detection for target detection of a quantum radar using the quantum receiver using square of homodyne detection for target detection of a quantum radar according to the present disclosure, includes: a first step of mixing a signal reflected by a target of signals generated by a light source that is quantum illumination, and a preserved idler signal, using a 50:50 beam splitter; a second step of performing homodyne detection on light quantities output from the two output terminals of the 50:50 beam splitter, respectively; a third step of determining a value obtained by squaring homodyne detection values, which are obtained by homodyne detection, and then summing up the squared values as a measurement value of the quantum receiver; and a fourth step of comparing the measurement value of the quantum receiver and T of the following Equation 3, $$T = \frac{K(\langle \hat{M}_0 \rangle \sqrt{\Delta M_1} + \langle \hat{M}_1 \rangle \sqrt{\Delta M_0})}{\sqrt{\Delta M_0} + \sqrt{\Delta M_1}} \quad \text{[Equation 3]}$$

where $\langle \hat{X} \rangle$ is an expectation value of an X operator and $\Delta X\bullet$ is distribution of the X operator—

Further, in the method of square of homodyne detection for target detection of a quantum radar according to the present disclosure, one output terminal of the two output terminals has the same direction as the signal, and the other one output terminal of the two output terminal has the same direction as the idler signal Further, in the method of square of homodyne detection for target detection of a quantum radar according to the present disclosure, the homodyne detection value that is measured at the one output terminal is a position measurement value of the signal, and the homodyne detection value that is measured at the other one output terminal is a momentum measurement value of the idler signal.

Further, in the method of square of homodyne detection for target detection of a quantum radar according to the present disclosure, it is determined that there is no target when the measurement value of the quantum receiver is larger than T of the Equation 3, and it is determined that there is a target when the measurement value of the quantum receiver is smaller than T of the Equation 3.

Meanwhile, in order to achieve the objectives, a quantum receiver using a square of homodyne detection for target detection of a quantum radar according to the present disclosure includes: a light source that is quantum illumination generating a signal and an idler that are a pair of quantum states; a target reflecting the signal generated from the light source; a preserver preserving the idler generated from the light source; a 50:50 beam splitter receiving the signal reflected from the target and the preserved idler through an input terminal, and the mixing the signal and the idler signal; and a first light quantity measurer and a second light quantity measurer performing homodyne detection on light quantities that are output from a first output terminal and a second output terminal of the 50:50 beam splitter, respectively.

Details of other embodiments are included in detailed description of the invention" and the accompanying "drawings".

The advantages and/or features of the present disclosure, and methods of achieving them will be clear by referring to the exemplary embodiments that will be describe hereafter in detail with reference to the accompanying drawings.

However, it should be noted that the present disclosure is not limited to the configuration of each of embodiments to be described hereafter and may be implemented in various ways, and the exemplary embodiments described in the specification are provided to complete the description of the present disclosure and let those skilled in the art completely know the scope of the present disclosure and the present disclosure is defined by claims.

Advantageous Effects

According to the present disclosure described above, there is an effect of providing a quantum receiver using square of homodyne detection for target detection of a quantum radar, the quantum receiver using homodyne detection, which is used in quantum information processing using a continuous variable, and square of homodyne detection, which uses data processing, and a measurement method therefor.

Further, according to the present disclosure, since the quantum receiver does not include non-linear optical devices, there is an effect that not only configuration of a test is easy, but efficiency can be improved.

DESCRIPTION OF DRAWINGS

FIG. 11 is a secondary interrelation graph of the number of quant in each mode of Two-Mode Squeezed Vacuum (TMSV) obtained through a test.

FIG. 12 is measurement value simulation graph of each measurement method using a test value of a quantum light source, in which (a) is a receiver using square of homodyne detection, (b) is an OPA receiver, (c) is a PC receiver, and (d) is classical illumination using homodyne detection.

BEST MODE FOR INVENTION

Figure 1:
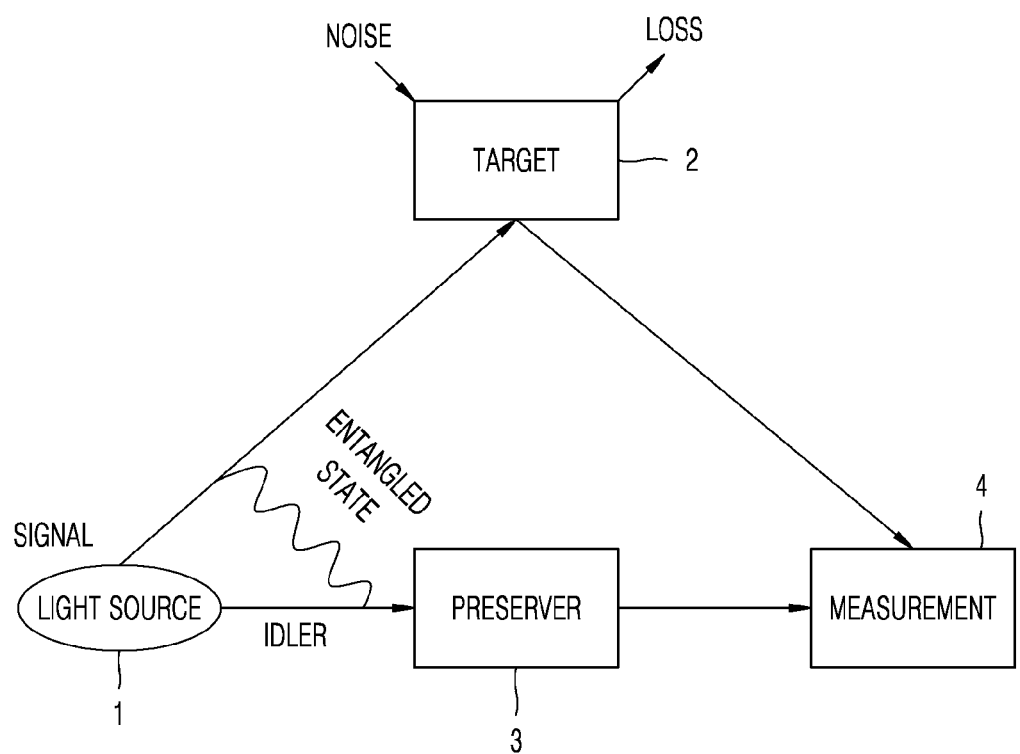
FIG. 1 is a diagram showing the configuration of quantum illumination of the related art.
Figure 2:
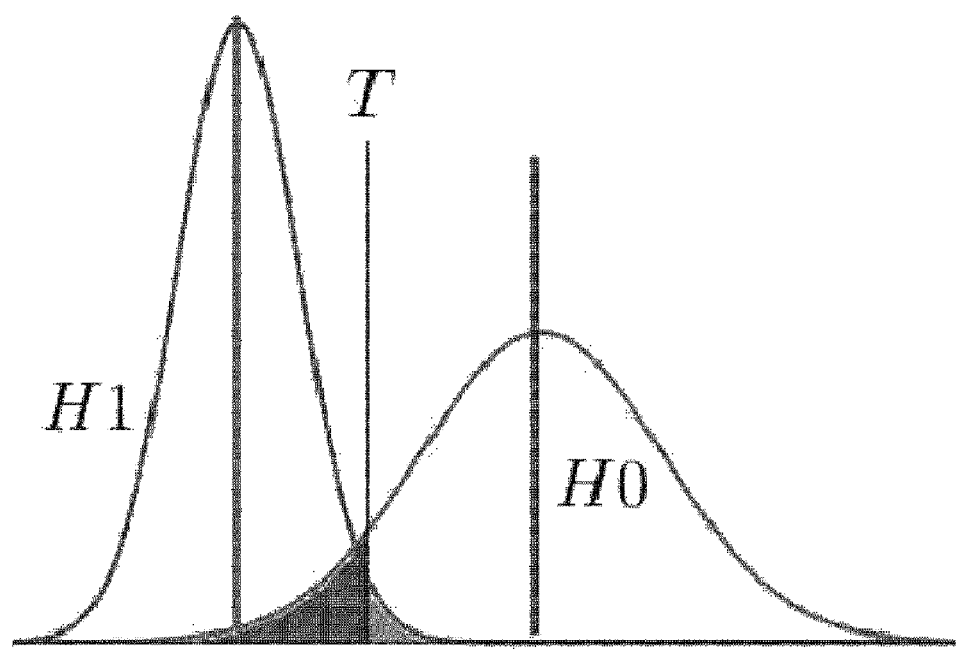
FIG. 2 is a diagram showing expectation value distribution when there is no target (H0, red line0 and when there is a target (H1, blue line) in quantum illumination of the related art, in which T is a reference for determining whether there is a target, the red surface shows false alarm, and the blue surface shows missed detection.

The present disclosure provides a quantum receiver using square of homodyne detection for target detection of a quantum radar, the quantum receiver using homodyne detection, which is used in quantum information processing using a continuous variable, and square of homodyne detection, which uses data processing, and a measurement method therefor.

MODE FOR INVENTION

Before describing the present disclosure in detail, terms or words used herein should not be construed as being limited to common or dictionary meanings, the concepts of various terms may be appropriately defined to the most optimally describe the disclosure by the inventor (s), and it should be noted that those terms or words should be construed as meanings and concepts corresponding to the technical spirit of the present disclosure.

That is, it should be noted that the terms used herein are used only to describing preferred embodiments of the present disclosure, not intending to limit the present disclosure in detail, and those terms are terms defined in consideration of various possibilities of the present disclosure.

Further, it should be noted that, in the specification, singular expression may include plural expression unless clearly stated in the sentences, and includes a singular meaning even if it is similarly expressed as a plural number.

It should be noted that when a component is described as "including" another component throughout the specification, the component may further include another component without another component excluded, unless specifically stated otherwise.

Further, it should be noted that when a component is described as "exists in" and "is connected to" another component, the component may be directly connected with another component, may be installed in contact with another component, or may be installed with a predetermined gap. When the component is installed with a gap, there may be a third component or means for fixing and connecting the component to another component, and the third component or means may not be described.

On the other hands, it should be understood that when a component is described as "directly connected" or "indirectly connected" to another component, it should be construed as there is no third component or means.

Similarly, the terms used herein to describe a relationship between elements, that is, "between", "directly between", "adjacent" or "directly adjacent" should be interpreted in the same manner as those described above.

Further, in the specification, it should be noted that terms such as "first side", "second side", "first", and "second", if used, are used to clearly discriminate one components from another component and the meaning of the corresponding component is not limited by the terms.

Further, terms related to positions such as "up", "down", "left", and "right", if used herein, should be construed as indicating relative positions of corresponding components in the corresponding figures and should not be construed as stating absolute positions unless the absolute positions of them are specified.

Further, in the specification, when components are given reference numerals, the same reference numerals are given to same components even if they are shown in different figures, that is, same reference numerals indicate same components throughout the specification.

The size, position, coupling relationship, etc. of components of the present disclosure may be partially exaggerated or reduced in the accompanying drawings for the convenience of description in order to sufficiently and clearly transmit the spirit of the present disclosure, so the proportion or scale may not be precise.

Further, in the following description of the present disclosure, components that are determined to unclearly make the spirit of the present disclosure unclear, for example, well-known technology including the related art may not be described in detail.

Hereafter, embodiments of the present disclosure are described in detail with reference to relevant drawings.

Figure 3:
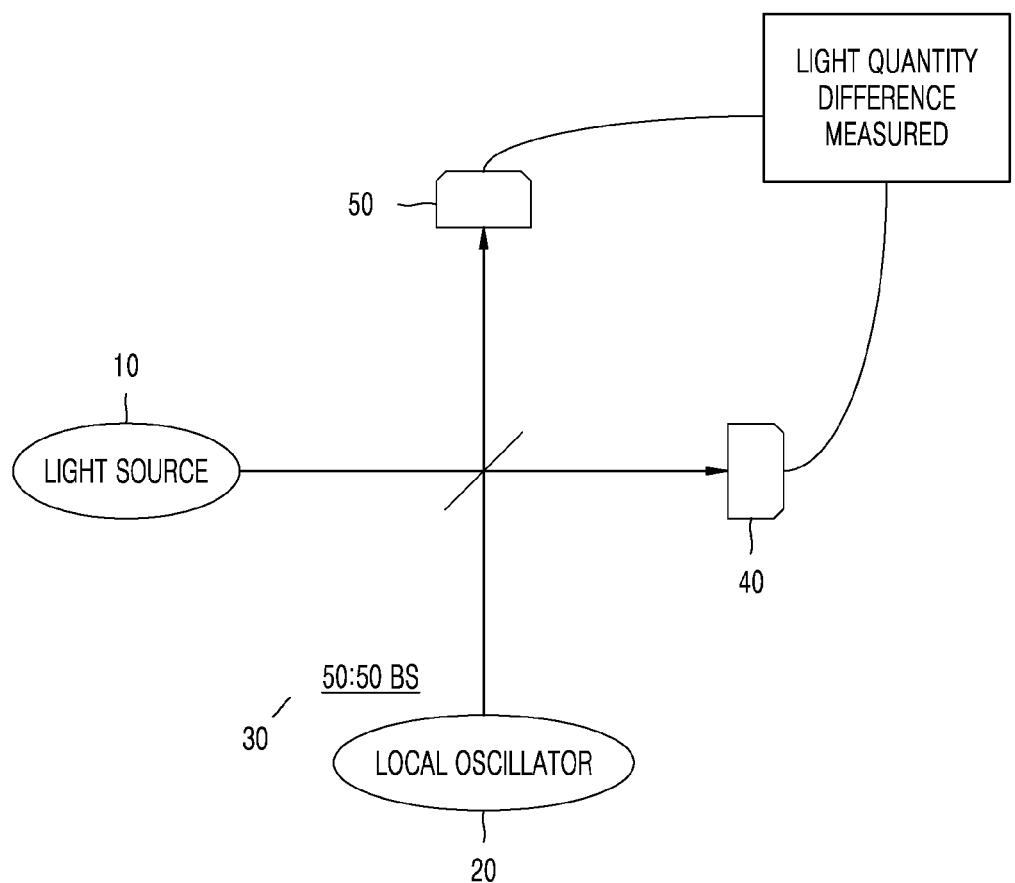
FIG. 3 is diagram showing the configuration of homodyne detection according to the present disclosure.

FIG. 3 is diagram showing the configuration of homodyne detection according to the present disclosure.

Referring to FIG. 3, homodyne detection according to the present disclosure is achieved as follows.

That is, homodyne detection is achieved by a light source 10, a local oscillator 20, a 50:50 beam splitter 30, and two light quantity measurers 40 and 50.

The 50:50 beam splitter 30 receiving, through an input terminal, a signal generated by the light source 10 and a continuous wave generated by the local oscillator 20 mixes the generated signal and the continuous wave.

Thereafter, the two light quantity measurers 40 and 50 measure light quantities output from two output terminals of the 50:50 beam splitter 30, respectively.

The light quantity difference between the two measurement values is the measurement value of homodyne detection.

In other words, a quantum receiver using homodyne detection that is used in a quantum information protocol using a continuous variable (CV) is provided.

Homodyne detection is a measurement method using the 50:50 beam splitter 30, the two light quantity measurers 40 and 50, and the local oscillator 20.

An input terminal of the 50:50 beam splitter 30 receives a returned signal, that is, a signal of two signals generated by quantum illumination, and a continuous wave generated by the local oscillator 20 is input to another terminal.

Light quantities are measured at two output terminals of the 50:50 beam splitter 30, respectively, and the difference between the two measurement values is the measurement value of homodyne detection.

In this case, it is possible to know the position information ($\theta=0$) or momentum information ($\theta=900$) of a signal that is a returned signal by adjusting the phase ($\theta$) of the local oscillator 20.

Homodyne detection that is used in quantum information processing that uses a continuous variable was described with reference to FIG. 3, and square of homodyne detection that uses data processing is described hereafter with reference to FIG. 4.

Figure 4:
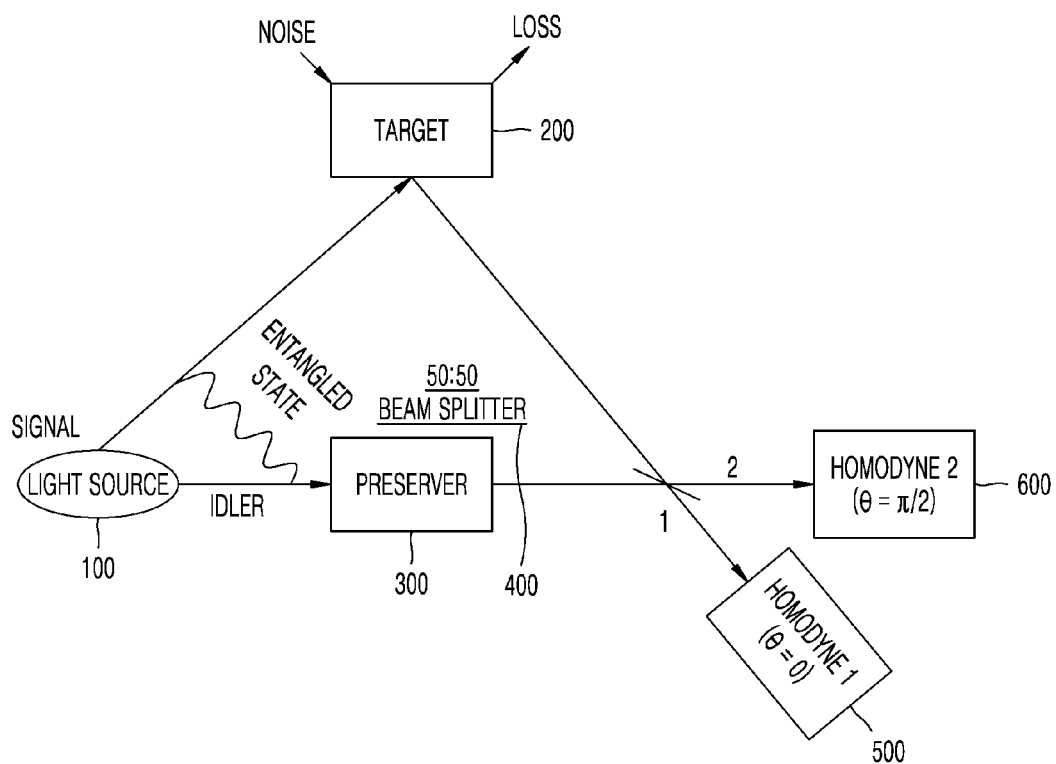
FIG. 4 is a diagram showing the configuration of quantum illumination using square of homodyne detection according to the present disclosure.

FIG. 4 is a diagram showing the configuration of quantum illumination using square of homodyne detection according to the present disclosure.

Referring to FIG. 4, the configuration of quantum illumination using square of homodyne detection according to the present disclosure includes a light source 100, a target 200, a preserver 300, a first 50:50 beam splitter 400, and two light quantity measurers 500 and 600.

That is, a quantum receiver using square of homodyne detection for target detection of a quantum radar according to the preset disclosure is includes a light source 100 that is quantum illumination generating a signal and an idler that are a pair of quantum states, a target 200 that reflects a signal generated from the light source 100, a preserver 300 that preserves the idler generated from the light source 100, a 50:50 beam splitter 400 that simultaneously receives and mixes a signal reflected by the target 200 and the preserved idler from the preserver 300 through an input terminal, and a first light quantity measurer 500 and a second light quantity measurer 600 that perform homodyne detection on light quantities output from a first output terminal 1 and a second output terminal 2 of the 50:50 beam splitter, respectively.

The light source is quantum illumination.
as described above, the light source that is quantum illumination generates a signal and an idler that are a pair of quantum states, in which the signal and the idler have been entangled.

A signal generated by the light source 100 is a quantum-state signal that is sent to the target 200, is reflected by the target, and then travels into the first 50:50 beam splitter 400.

Further, an idler generated by the light source 100 is a quantum-state signal that is preserved in the preserver and then travels into the first 50:50 beam splitter 400 simultaneously together with the signal reflected and returned by the target.

As described above, the signal reflected by the target and the preserved idler travel into the input terminal of the first 50:50 beam splitter 400.

The first 50:50 beam splitter 400 mixes signals traveling into the terminal, that is, the signal and the idler.

The two light quantity measurers 500 and 600 measure light quantities output from two output terminals of the first 50:50 beam splitter 400, respectively.

In this configuration, one of the two output terminals is the first light quantity measurer 500 that performs homodyne detection on the light quantity that is output from the first output terminal of the first 50:50 beam splitter 400 and the other one of the two output terminals is the second light quantity measurer 600 that performs homodyne detection on the light quantity that is output from the second output terminal of the first 50:50 beam splitter 400.

FIG. 11 is a diagram showing the configuration of first homodyne detection according to the present disclosure and FIG. 12 is a diagram showing the configuration of second homodyne detection according to the present disclosure.

Referring to FIG. 11, the first light quantity measurer 500 performs first homodyne detection, and referring to FIG. 12, the second light quantity measurer 600 performs second homodyne detection.

That is, in the first light quantity measurer 500, a local oscillator that generates a continuous wave is called a first local oscillator 520 and a 50:50 beam splitter is called as a second 50:50 beam splitter 530.

The first light quantity measurer 500 mixes a light signal 510 traveling into the first light quantity measurer 500 and a continuous wave generated by the first local oscillator 520 using the second 50:50 beam splitter 530, and performs first homodyne detection that measures the difference between first light quantities output from two output terminals of the second 50:50 beam splitter 530, respectively.

Similarly, in the second light quantity measurer 600, a local oscillator that generates a continuous wave is called a second local oscillator 620 and a 50:50 beam splitter is called as a third 50:50 beam splitter 630.

The second light quantity measurer 600 mixes a light signal 610 traveling into the second light quantity measurer 600 and a continuous wave generated by the second local oscillator 620 using the third 50:50 beam splitter 630, and performs second homodyne detection that measures the difference between second light quantities output from two output terminals of the third 50:50 beam splitter 630, respectively.

In other words, a signal generated by the light source 100 is reflected by the target 200 and travels into the input terminal of the first 50:50 beam splitter 400, and an idler generated by the light source 100 is preserved by a preserver and travels into the input terminal of the second light quantity measurer 600 simultaneously together with the signal.

The signal and the idler coming in the first 50:50 beam splitter 400 are mixed with each other and output to the first output terminal 1 and the second output terminal 2, respectively.

The light output to the first output terminal 1 undergoes first homodyne detection by the first light quantity measurer 500 and the light output to the second output terminal 2 undergoes second homodyne detection by the second light quantity measurer 600.

The first homodyne detection and the second homodyne detection are performed, as described above with reference to FIG. 3.

The phase difference between the first local oscillator 520 when first homodyne detection is performed in the first light quantity measurer 500 and the second local oscillator 620 when second homodyne detection is performed in the second light quantity measurer 600 may be Π/2.

Further, square homodyne detection value is generated by squaring the measurement value of the first homodyne detection and the measurement value of the second homodyne detection and then summing up the squared values.

Whether there is a target is determined using square homodyne detection value generated in this way.

In this case, when square homodyne detection value is larger than a predetermined reference value T, it is determined that there is no target, and when square homodyne detection value is smaller than the predetermined reference value T, it is determined that there is a target.

In this case, the first homodyne detection measures the position of a light signal traveling into the first light quantity measurer 500 and the second homodyne detection measures the momentum of a light signal traveling into the second light quantity measurer 600.

This will be described in more detail with reference to FIG. 10.

Figure 10:
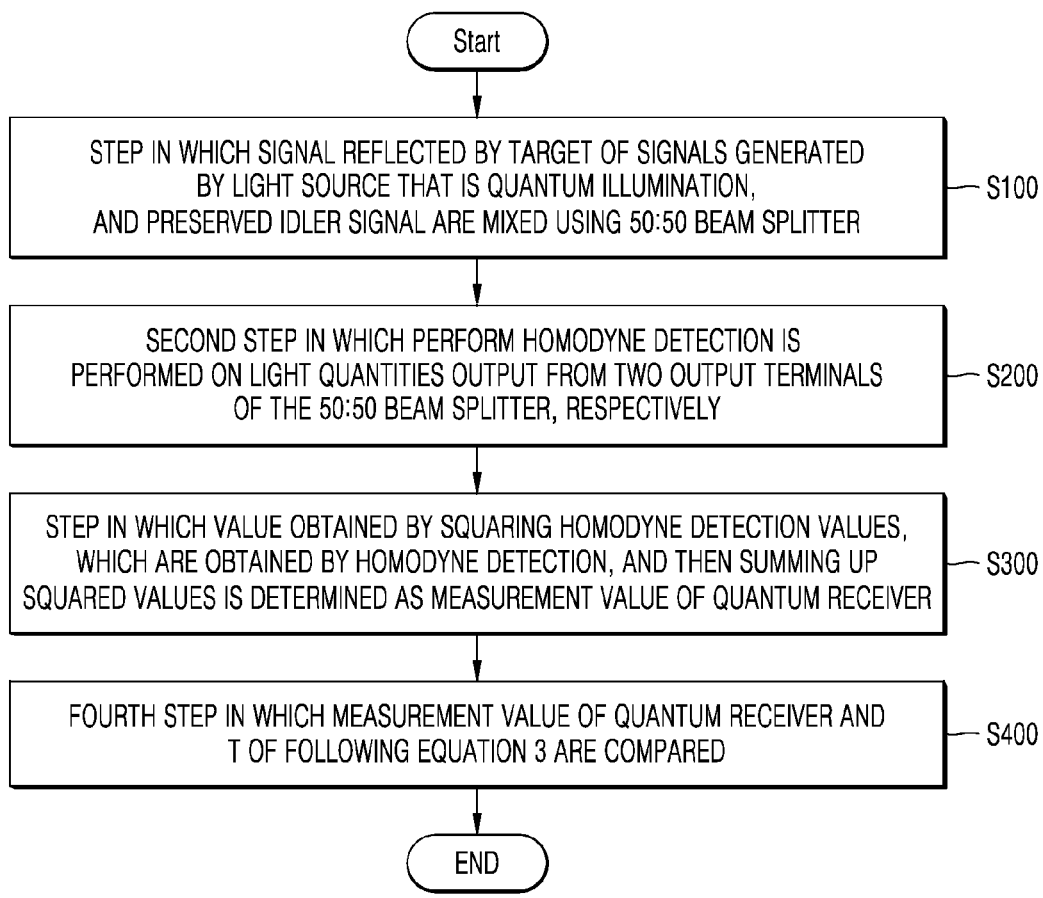
FIG. 10 is an enlarged graph showing the relationship between the reflectivity of a target and a discrete signal-to-noise ratio according to a receiver of quantum illumination.

FIG. 10 is a flowchart showing the flow of a method of square of homodyne detection for target detection of a quantum radar.

Referring to FIG. 10, the method of square of homodyne detection for target detection of a quantum radar using a quantum receiver using square of homodyne detection for target detection of a quantum radar according to the present disclosure is composed of a total of four steps.

In a first step S100, a signal reflected by the target of signals generated by the light source 100 that is quantum illumination, and a preserved idler signal are mixed using the 50:50 beam splitter 400.

In a second step S200, the first light quantity measurer 500 and the second light quantity measurer 600 perform homodyne detection on light quantities output from the two output terminals 1 and 2 of the 50:50 beam splitter 400, respectively.

Ina third step S300, a value obtained by squaring homodyne detection values, which are obtained by homodyne detection, and then summing up the squared values is determined as the measurement value of a quantum receiver.

In a fourth step S400, the measurement value of a quantum receiver and T of the following Equation 3 are compared.

$$T = \frac{K(\langle \hat{M}_0 \rangle \sqrt{\Delta M_1} + \langle \hat{M}_1 \rangle \sqrt{\Delta M_0})}{\sqrt{\Delta M_0} + \sqrt{\Delta M_1}} \quad \text{[Equation 3]}$$

where $\langle \hat{X} \rangle$ is an expectation value of an X operator and $\Delta X\bullet$ is distribution of the X operator—

Further, a base 0 shows an expectation value and distribution when there is no target (H0), the base 1 shows an expectation value and distribution when there is a target (H1), and κ is the number of used signal modes.

In this case, in the second step S200, one output terminal 1 of the two output terminals has the same direction as the signal and the other one output terminal 2 of the two output terminal has the same direction as the idler signal.

In this case, the homodyne detection value that is measured at one output terminal 1 is a position measurement value of the signal and the homodyne detection value that is measured at the other one output terminal 2 is a momentum measurement value of the idler signal.

Accordingly, it is determined that there is no target when the measurement value of the quantum receiver is larger than T of Equation 3, and it is determined that there is a target when the measurement value of the quantum receiver is smaller than T of Equation 3.

In other words, square of homodyne detection method that is used in quantum illumination is as follows.

1. A returned signal and a preserved signal (idler) are mixed by the 50:50 beam splitter 400.
2. Homodyne detection is performed at each of the two output terminals 1 and 2 of the 50:50 beam splitter 400. In this case, position measurement of a signal is performed at the first output terminal (the same direction as an entering signal) (θ=0), momentum measurement of a signal is performed at the second output terminal (the same direction as the preserved signal) (θ=90°).
3. A value obtained by squaring measurement values obtained through homodyne detection and then summing up the squared values is determined as the measurement value of the entire receiver.
4. H0 is determined when the measurement value of the entire receiver is larger than a determination reference T, and H1 is determined when the measurement value is smaller.

The determination reference is determined as the average of the entirety as in the following Equation.

Measurement by Equation 3 can be expressed as in the following Equation 4 using an operator.

$$\hat{M} = \hat{U}_{BS}(\hat{x}_1^2 + \hat{p}_2^2)\hat{U}_{BS}^\dagger \quad \text{(Equation 4)}$$
$$= \hat{a}_R \hat{a}_R^\dagger - \hat{a}_R^\dagger \hat{a}_I^\dagger - \hat{a}_R \hat{a}_I + \hat{a}_I^\dagger \hat{a}_I$$

where x and p are position and momentum operators, respectively, and $\hat{U}_{BS}$ is a beam splitter operator. $\hat{a}$ and $\hat{a}^\dagger$ are preservation (boson) operators showing a destructor and a creator, and the bases R, I, 1, and 2 mean a returned signal, a preserved signal, a first output terminal of the beam splitter, and a second output terminal mode of the beam splitter, respectively.

As described above, in the quantum receiver using square of homodyne detection for target detection of a quantum radar according to the present disclosure, square of homodyne detection is achieved by a 50:50 beam splitter, light quantity measurers, and local oscillator, so non-linear optical device are not included.

Accordingly, not only it is easy to configure a test, but efficiency can be improved.

It is possible to see test efficiency b comparing Signal-to-Noise Ratios (SNR) to be described below.

In order to show usefulness of square of homodyne detection, the SNR of quantum illumination using square of homodyne detection is compared with the SNR of quantum illumination using existing quantum receivers.

A measurement SNR and a discrete SNR are analyzed to analyze the performance of quantum illumination using square of homodyne detection.

The measurement SNR, which is a value that is used in common signal measurement, is the ratio of signal intensity to noise intensity.

The value can be expressed from the following Equation 5.

$$SNR_M = \frac{\langle \hat{M}_1 \rangle \sqrt{K}}{\sqrt{\Delta M_1}} \quad \text{(Equation 5)}$$

A measurement value is constant when there is an object (H1), an SNR can be obtained from a standard difference of H1.

Figure 5:
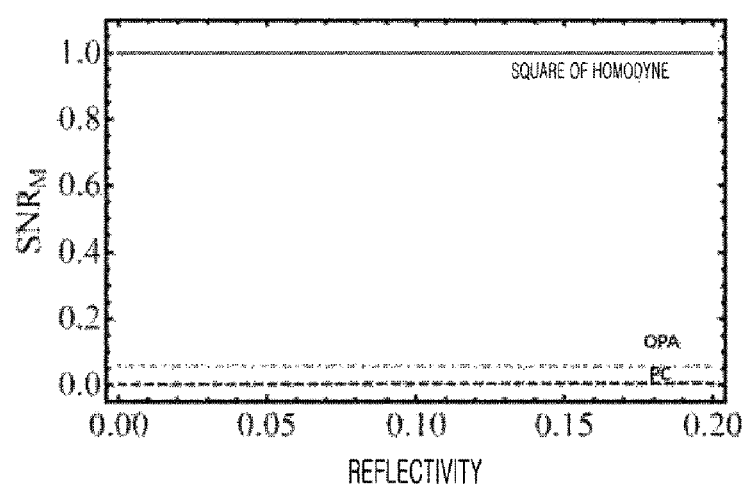
FIG. 5 is a diagram showing the configuration of first homodyne detection according to the present disclosure.

FIG. 5 is a graph showing the relationship between the reflectivity of a target and a measurement signal-to-noise ratio of a single mode according to a receiver of quantum illumination.

Referring to FIG. 5, a graph showing the relationship between the reflectivity of a target and a measurement SNR of a single mode according to a receiver of quantum illumination is shown.

In the graph, the red line corresponds to the case in which square of homodyne detection was used, the orange line corresponds to the case in which an OPA receiver was used, and the blue line corresponds to the case in which a PC receiver was used.

The average number of quanta of a signal is 0.001 and the average number of quanta of thermal noise is 30 in the graph.

As can be seen from the graph, it is possible to know that the measurement SNR of quantum illumination is remarkably improved when square of homodyne detection was used in comparison to when other receivers were used.

The discrete SNR is a value showing how much accurate the determination about whether there is a target is, and can be obtained from the following Equation 6.

$$SNR_D = \frac{K(\langle \hat{M}_0 \rangle - \langle \hat{M}_1 \rangle)^2}{2(\sqrt{\Delta M_0} + \sqrt{\Delta M_1})^2} \quad \text{(Equation 6)}$$

Figure 6:
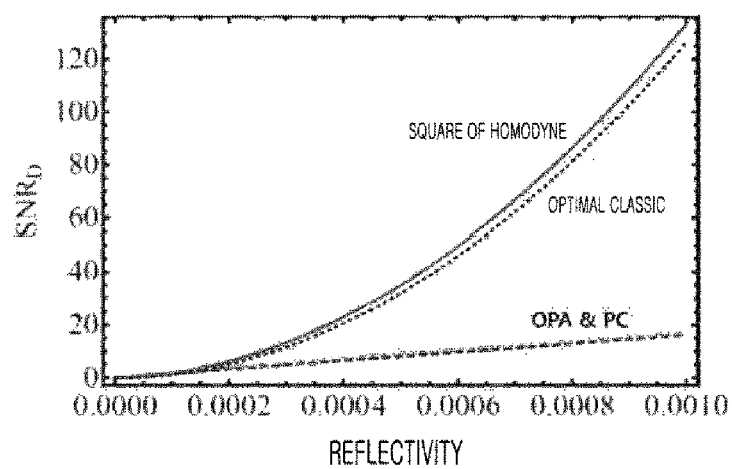
FIG. 6 is a diagram showing the configuration of second homodyne detection according to the present disclosure.

FIG. 6 is a graph showing the relationship between the reflectivity of a target and a discrete signal-to-noise ratio according to a receiver of quantum illumination.

Referring to FIG. 6, a graph showing the relationship between the reflectivity of a target and a discrete signal according to a receiver of quantum illumination is shown.

The red line corresponds to when square of homodyne detection was used, the orange line corresponds to when an OPA receiver was used, the blue line corresponds to when a PC receiver was used, and the black line corresponds to when an optimized classical illumination obtained from Chernoff Bound was used.

The average number of quanta of a signal is 0.001, the average number of quanta of thermal noise is 30 in the graph, and the number of modes of used signals is 109.

In the graph, it can be seen that the discrete SNR is the bet when square of homodyne detection is used if the reflectivity of a target is substantially larger than $1.3 \times 10^{-4}$, and it can be seen that only quantum illumination using only square of homodyne detection has a discrete SNR higher than the bound discretion SNR of the classical illumination when the reflectivity of a target is larger than $1.7 \times 10^{-4}$.

Figure 7:
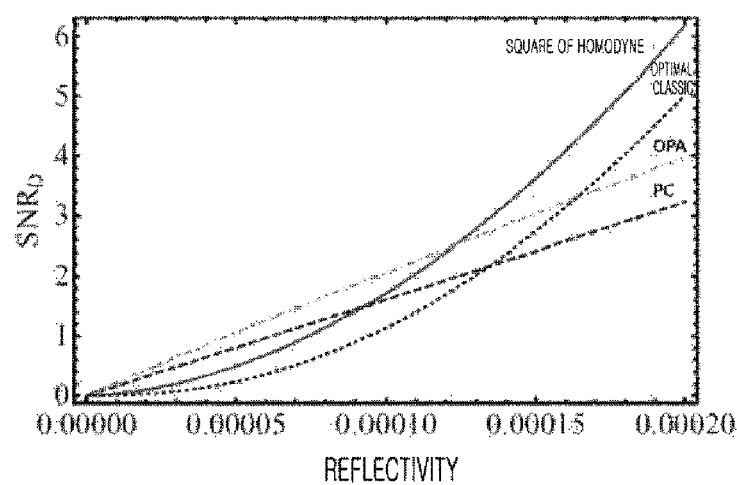
FIG. 7 is a flowchart showing the flow of a method of square of homodyne detection for target detection of a quantum radar.

FIG. 7 is an enlarged graph showing the relationship between the reflectivity of a target and a discrete signal-to-noise ratio according to a receiver of quantum illumination.

Referring to FIG. 7, a receiver having the highest efficiency of receivers analyzed in accordance with the reflectivity of a target on the basis of the discrete SNR described with reference to FIG. 6 is provided.

In general, a low reflector having reflectivity of 1% or less is assumed in quantum illumination researches, and in this case, it can be seen that the reflectivity range in which square of homodyne detection has the highest efficiency is widest.

By comparing to two SNRs described with reference to FIGS. 9 and 10, it can be seen that square of homodyne detection not only can obtain a clearer signal in comparison to the existing proposed receivers, but can more accurately determine whether there is a target, which is arranged in Table 1.

TABLE 1

| Reflectivity of target | Receiver with highest efficiency |
| --- | --- |
| 0–0.00013 | OPA receiver |
| 0.00013–0.012 | square of homodyne detection receiver |
| 0.012–1 | Optimized classical illumination |

Figure 8:
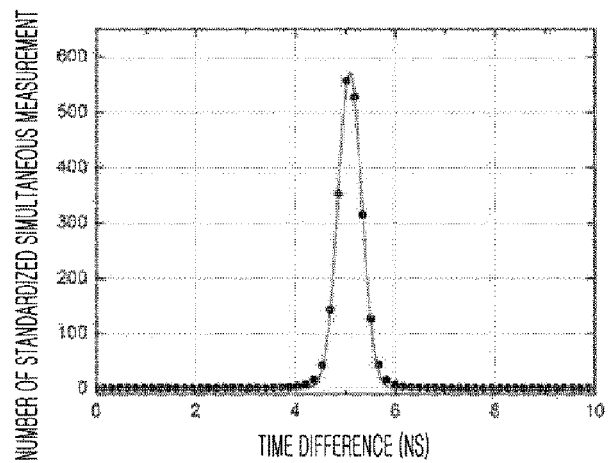
FIG. 8 is a graph showing the relationship between the reflectivity of a target and a measurement signal-to-noise ratio of a single mode according to a receiver of quantum illumination.

FIG. 8 is a secondary interrelation graph of the numbers of quant in the modes of Two-Mode Squeezed Vacuum (TMSV) obtained through a test.

Referring to FIG. 8, a secondary interrelation graph of the numbers of quant in two modes when Two-Mode Squeezed Vacuum (TMSV) was obtained through test is shown.

A secondary interrelation is obtained from the following Equation 7.

$$g^{(2)}(\tau) = \frac{\langle \hat{n}_I(t) \hat{n}_S(t+\tau) \rangle}{\langle \hat{n}_I(t) \rangle \langle \hat{n}_S(t+\tau) \rangle} \quad \text{(Equation 7)}$$

where $\hat{n}$ is the operator of the number of quanta, and the bases S and I are a signal mode and an idler mode, respectively.

When there is no quantum interrelationship, the secondary interrelation has a value of 1 at the most.

It can be seen from FIG. 8 that the secondary interrelation value exceeds 1, so there is quantum interrelationship.

The wavelength in each mode of the TMSV is 810 nm and the average number of quanta in each mode is $3 \times 10^{-5}$.

Measurement according to each measurement value using data obtained from corresponding light sources was simulated, as in FIG. 9 to be described below.

Figure 9:
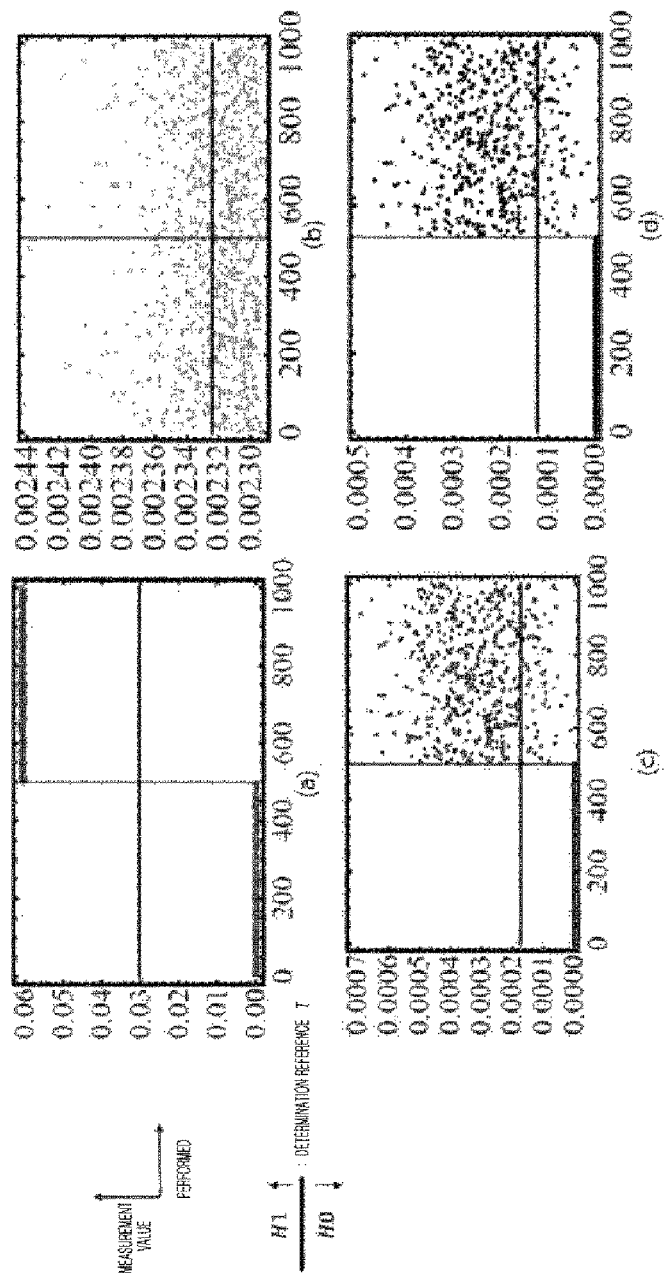
FIG. 9 is a graph showing the relationship between the reflectivity of a target and a discrete signal-to-noise ratio according to a receiver of quantum illumination.

FIG. 9 is measurement value simulation graph of each measurement method using a test value of a quantum light source, in which (a) is a receiver using square of homodyne detection, (b) is an OPA receiver, (c) is a PC receiver, and (d) is classical illumination using homodyne detection.

Referring to FIG. 9, it was assumed in simulation measurement that perfect measurement has measurement efficiency of 1, the average number of quanta of thermal noise is 30, and the standard difference of the average number of quanta of thermal noise is 0.001 (temperature variation of about 10 K).

The cases until the 500-th test show measurement values when there is no object (H0) and the cases from the 501-th test show measurement values when there is an object having reflectivity of 0.1%.

The black horizontal line is a determination reference T, and H1 is determined when it is higher than the reference value, and H0 is determined when it is lower than the reference value.

The following data processing was performed on $\hat{M}$ defined above for consistency of a graph in square of homodyne detection.

$$\hat{M}_{DP} = -(\hat{M} - \langle \hat{M}_0 \rangle)$$ (Equation 8)

A measurement value of 0 was given when there is no object and a measurement value that is not 0 was obtained, and the values were compared, similar to other measurement.

FIG. 9 (a) shows the case in which square of homodyne detection was used. It can be seen that, for reflectivity of 0.1%, the difference of measurement values is 0.6 and an error ratio is 0 when there is no target and there is a target.

FIG. 9 (b) shows the case in which an OPA receiver was used, in which it can be sent normal measurement is impossible due to variation of the number of quanta of a signal and the average number of quanta of thermal noise.

FIG. 9 (c) shows the case in which a PC receiver was used, there is an average measurement difference of about O.0003 when there is a target and there is no target.
When it can be seen that it is measured under a reference value even in the cases after the 500-th test, that is, an error is generated.

FIG. 9 (d) is the case when homodyne detection was used in classical illumination.

It has been known that using homodyne detection gradually has optimal efficiency.

It can be seen that the difference in measurement value when there is a target and there is no target is about 0.0002~0.0003, and the measurement value is pointed under the reference value and an error is generated even though there is a target.

The difference between measurement values in H0 and H1 when square of homodyne detection was used in the simulation is the largest, so they can be clearly discriminated, and as compared with other measurement, accurate discretion is possible even through the resolution of an actinometer.

Further, since the error ratio is the lowest, it can be considered that a quantum receiver using square of homodyne detection is the most suitable for quantum illumination.

A quantum receiver using a method of square of homodyne detection in quantum illumination is provided through the present disclosure.

In the present disclosure proposed through theoretical analysis, it was observed that test configuration was easy and efficiency was good in comparison to existing quantum receivers.

Finally, higher efficiency was observed in comparison to other receivers through simulation based on test data.

According to the present disclosure described above, there is an effect of providing a quantum receiver using square of homodyne detection for target detection of a quantum radar, the quantum receiver using homodyne detection, which is used in quantum information processing using a continuous variable, and square of homodyne detection, which uses data processing, and a measurement method therefor.

Further, according to the present disclosure, since the quantum receiver does not include non-linear optical devices, there is an effect that not only configuration of a test is easy, but efficiency can be improved.

Various preferred embodiments of the present disclosure were described above through some examples, but the various embodiments described in "detailed description of the invention" are only examples and it would be clearly understood by those skilled in the art the present disclosure may be changed in various ways or equivalently implemented from the above description.

Further, it should be noted that since the present disclosure may be implemented in other various ways, the present disclosure is not limited to the above description, the above description is provided to completely explain the present disclosure and provided only to completely inform those skilled in the art of the range of the present disclosure, and the present disclosure is defined by only claims.

INDUSTRIAL APPLICABILITY

The present disclosure provides a quantum receiver using square of homodyne detection for target detection of a quantum radar, the quantum receiver using homodyne detection, which is used in quantum information processing using a continuous variable, and square of homodyne detection, which uses data processing, and a measurement method therefor.

The invention claimed is:

1. A quantum receiver using square of homodyne detection for target detection of a quantum radar, the quantum receiver comprising:
    a first 50:50 beam splitter mixing signals traveling inside through an input terminal; and
    two light quantity measurers measuring light quantities that are output through two output terminals of the first 50:50 beam splitter;
    wherein a first light quantity measurer performs homodyne detection on a light quantity that is output through a first output terminal that is one of the two output terminals; and a second light quantity measurer performs homodyne detection on a light quantity that is output through a second output terminal that is the other of the two output terminals, wherein the first light quantity measurer mixes a light signal traveling into the first light quantity measurer and a continuous wave generated by a first local oscillator using a second 50:50 beam splitter, and performs first homodyne detection for measuring first light quantity differences that are output through two output terminals of the second 50:50 beam splitter, respectively;

wherein the second light quantity measurer mixes a light signal traveling into the second light quantity measurer and a continuous wave generated by a second local oscillator using a third 50:50 beam splitter, and performs second homodyne detection for measuring second light quantity differences that are output through two output terminals of the third 50:50 beam splitter, respectively;

wherein the second light quantity measurer mixes a light signal traveling into the second light quantity measurer and a continuous wave generated by a second local oscillator using a third 50:50 beam splitter, and performs second homodyne detection for measuring second light quantity differences that are output through two output terminals of the third 50:50 beam splitter, respectively;

wherein the second light quantity measurer mixes a light signal traveling into the second light quantity measurer and a continuous wave generated by a second local oscillator using a third 50:50 beam splitter, and performs second homodyne detection for measuring second light quantity differences that are output through two output terminals of the third 50:50 beam splitter, respectively;

wherein a value of square of homodyne detection is generated by squaring a measurement value of the first homodyne detection and a measurement value of the second homodyne detection and then summing up the squared values;

wherein a phase difference between the first local oscillator and the second local oscillator is Π/2;

wherein the first homodyne detection measures a position of an optical signal traveling into the first light quantity measurer, and the second homodyne detection measures momentum of an optical signal traveling into the second light quantity measurer;

wherein signals traveling in to the first 50:50 beam splitter are a signal and an idler that are a pair of quantum states generated by a light source that is quantum illumination, and the signal and the idler have been entangled;

wherein the signal generated by the light source is a quantum-state signal that is sent to a target, is reflected, and then travels into the first 50:50 beam splitter; and wherein the idler generated by the light source is a quantum-state signal that is preserved and then travels into the first 50:50 beam splitter simultaneously together with the returned signal.

2. The quantum receiver of claim 1, wherein whether there is a target is determined using the value of square of homodyne detection.

3. The quantum receiver of claim 2, wherein it is determined that there is no target when the value of square of homodyne detection is larger than a predetermined reference value, and it is determined that there is a target when the value of square of homodyne detection is smaller than the predetermined reference value.

4. A method of square of homodyne detection for target detection of a quantum radar using the quantum receiver using square of homodyne detection for target detection of a quantum radar of claim 1, the method comprising:

a first step of mixing a signal reflected by a target of signals generated by a light source that is quantum illumination, and a preserved idler signal, using a 50:50 beam splitter;

a second step of performing homodyne detection on light quantities output from the two output terminals of the 50:50 beam splitter, respectively;

a third step of determining a value obtained by squaring homodyne detection values, which are obtained by homodyne detection, and then summing up the squared values as a measurement value of the quantum receiver; and a fourth step of comparing the measurement value of the quantum receiver and T of the following Equation 3, $$T = \frac{K(\langle \hat{M}_0 \rangle \sqrt{\Delta M_1} + \langle \hat{M}_1 \rangle \sqrt{\Delta M_0})}{\sqrt{\Delta M_0} + \sqrt{\Delta M_1}}$$ [Equation 3]

where $\langle \hat{X} \rangle$ is an expectation value of an X operator and $\Delta X$ is distribution of the X operator;

wherein the method, the quantum receiver comprises:

a light source that is quantum illumination generating a signal and an idler that are a pair of quantum states;

a target reflecting the signal generated from the light source;

a preserver preserving the idler generated from the light source;

a 50:50 beam splitter receiving the signal reflected from the target and the preserved idler through an input terminal, and the mixing the signal and the idler signal; and a first light quantity measurer and a second light quantity measurer performing homodyne detection on light quantities that are output from a first output terminal and a second output terminal of the 50:50 beam splitter, respectively.

5. The method of claim 4, wherein in the second step, one output terminal of the two output terminals has the same direction as the signal, and the other one output terminal of the two output terminal has the same direction as the idler signal.

6. The method of claim 5, wherein the homodyne detection value that is measured at the one output terminal is a position measurement value of the signal, and the homodyne detection value that is measured at the other one output terminal is a momentum measurement value of the idler signal.

7. The method of claim 4, wherein it is determined that there is no target when the measurement value of the quantum receiver is larger than T of the Equation 3, and it is determined that there is a target when the measurement value of the quantum receiver is smaller than T of the Equation 3.

* * * * *